US 6,684,346 B2

(12) United States Patent
Tu et al.

(10) Patent No.: US 6,684,346 B2
(45) Date of Patent: Jan. 27, 2004

(54) METHOD AND APPARATUS FOR MACHINE CHECK ABORT HANDLING IN A MULTIPROCESSING SYSTEM

(75) Inventors: Steven Tu, Phoenix, AZ (US); Hang Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 09/745,688

(22) Filed: Dec. 22, 2000

(65) Prior Publication Data

US 2002/0116664 A1 Aug. 22, 2002

(51) Int. Cl.[7] .............................................. G06F 11/00
(52) U.S. Cl. ............................ 714/11; 714/10; 714/12
(58) Field of Search ................... 714/9, 10, 11, 714/12

(56) References Cited

U.S. PATENT DOCUMENTS

| | | | | | |
|---|---|---|---|---|---|
| 5,214,652 A | * | 5/1993 | Sutton | ............. | 714/10 |
| 5,367,668 A | * | 11/1994 | Pandolfo | ............. | 714/12 |
| 5,796,937 A | * | 8/1998 | Kizuka | ............. | 714/13 |
| 6,189,117 B1 | * | 2/2001 | Batchelor et al. | ............. | 714/48 |
| 6,453,427 B2 | * | 9/2002 | Quach et al. | ............. | 714/6 |
| 6,553,512 B1 | * | 4/2003 | Gibson | ............. | 714/17 |
| 2002/0116438 A1 | * | 8/2002 | Tu et al. | ............. | 709/104 |

OTHER PUBLICATIONS

Milojicic, Dejan et al. Increasing Relevance of Memory Hardware Errors A Case for Recoverable Programming Models, HP Labs, date unknown.*

* cited by examiner

Primary Examiner—Robert Beausoliel
Assistant Examiner—Bryce P. Bonzo
(74) Attorney, Agent, or Firm—Larry Mennemeier

(57) ABSTRACT

In a multiprocessor, access to shared resources is provided by a semaphore control mechanism, herein disclosed. The semaphore control mechanism provides for a high degree of programmable firmware reuse requiring relatively few modifications from a uniprocessor.

A machine check abort (MCA) handling mechanism is disclosed, which works with the semaphore control mechanism in the multiprocessor to provide improved system availability and reliability. The MCA handling mechanism provides for synchronization of multiple processors and shared resources and for timely execution resumption within the processors that remain on-line.

30 Claims, 9 Drawing Sheets

METHOD AND APPARATUS FOR MACHINE CHECK ABORT HANDLING IN A MULTIPROCESSING SYSTEM

FIELD OF THE INVENTION

This invention relates generally to multiprocessing systems, and in particular to synchronization of multiple processors and shared resources such as cache resources, computation resources or bus resources during exception handling by a machine check abort handling mechanism.

BACKGROUND OF THE INVENTION

Shared resources comprising a hardware component such as a display device or a printer in multiprocessing systems have been managed through a variety of mechanisms. Some of these mechanisms entail the use of atomic primitives such as "test and set", "compare and swap", or "load and reserve" to request access to the shared resource. At some system layer the details of such a mechanism and its primitives are specified.

These system level specifications define the resource sharing for a particular system and are not generally portable or scalable to another multiprocessing system without some additional modifications to the same system level specifications or to the specifications of some other system layers. In other words, management of such shared resources is not transparent to the system. Furthermore, for a multiprocessing system having multiple logical processing cores integrated into a single device, management of shared resources in a way that is transparent to the system has not previously been addressed.

Further complexities exist in error detection, correction and recovery for a multiprocessing system that has resources shared by multiple logical processing cores. A machine check abort (MCA) exception occurs in a processor when an error condition has arisen that requires corrective action. Lacking careful synchronization of the multiple logical processing cores and shared resources, damage or data corruption would potentially result. Handling MCA exception conditions in this type of a multiprocessing system has not previously been addressed.

BRIEF DESCRIPTION OF THE DRAWINGS

The present invention is illustrated by way of example and not limitation in the figures of the accompanying drawings.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

In a multiprocessor, access to shared resources is provided by a semaphore control mechanism, herein disclosed. The semaphore control mechanism provides for a high degree of programmable firmware reuse requiring relatively few modifications in comparison to a processor that does not share resources.

A machine check abort (MCA) handling mechanism is disclosed, which operates with the semaphore control mechanism in the multiprocessor to provide improved system availability and reliability. The MCA handling mechanism provides for synchronization of multiple processors and shared resources and for timely execution resumption within the processors that remain on-line.

For the purpose of the following disclosure, a processor may be viewed as an abstraction that includes but is not limited to a processing element having an execution core for executing operations according to an architecturally defined or micro-architecturally defined instruction set. The physical boundaries of multiple processors may, accordingly, be permitted to overlap each other.

Figure 1:
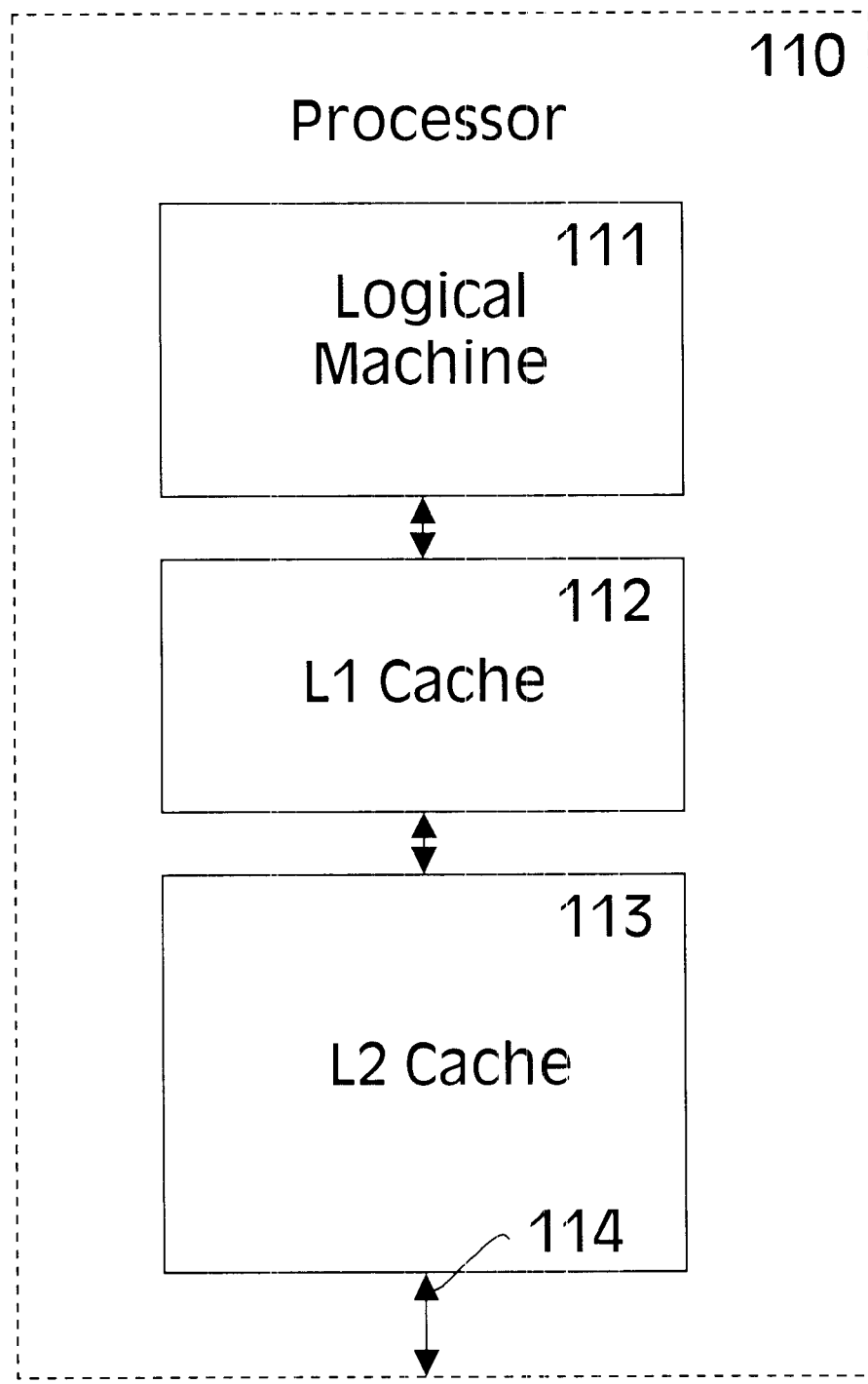
FIG. 1 illustrates an abstraction of a single processor.

FIG. 1 illustrates one embodiment of an abstraction of a single processor 110. Processor 110 includes a processing element, logical machine 111; a cache storage resource, L1 cache 112; a cache storage resource, L2 cache 113, and a data transmission resource 114.

Figure 2:
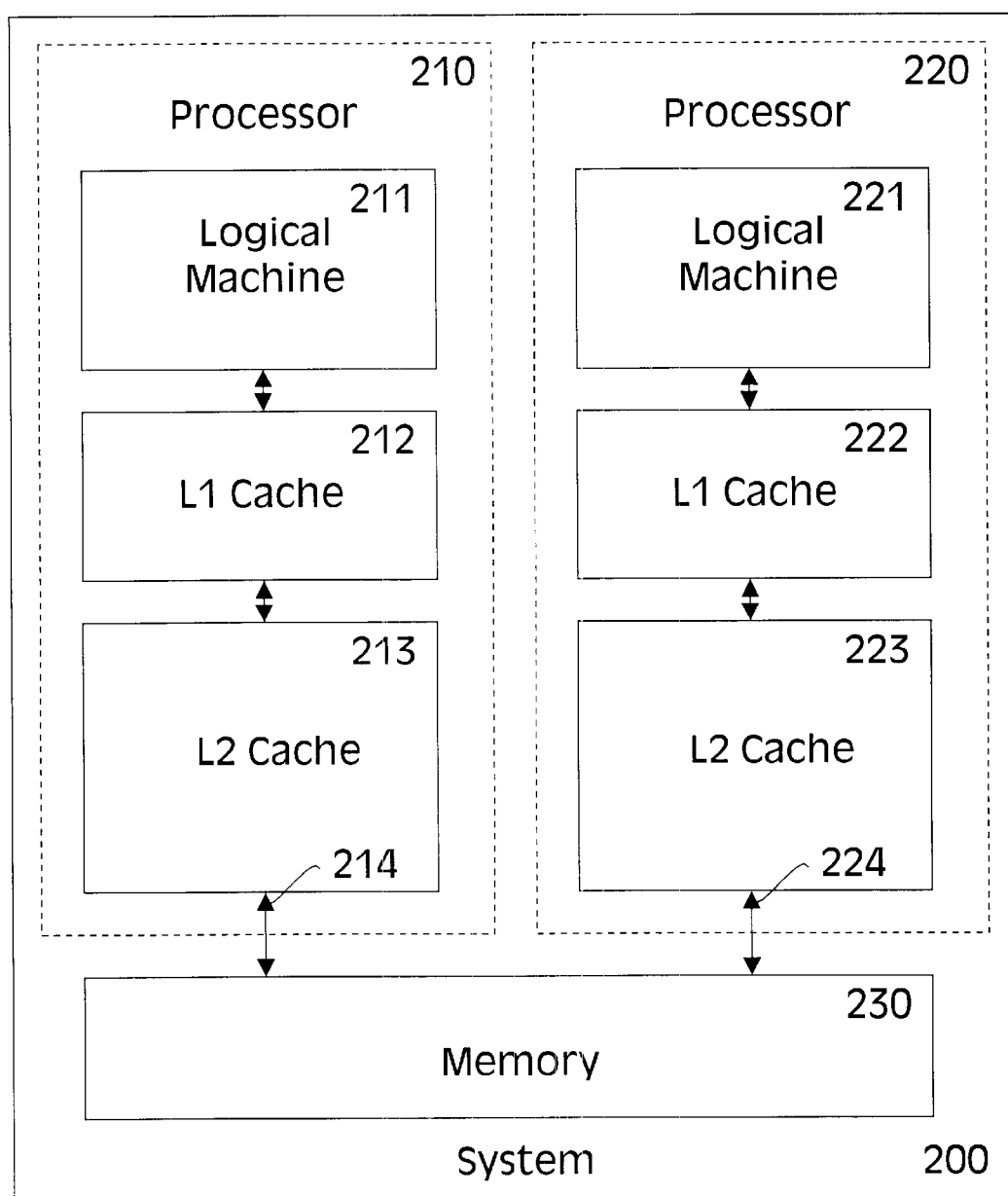
FIG. 2 illustrates a dual processor system based on the abstraction of single processors.

FIG. 2 illustrates a dual processor system 200 based on the abstraction of single processors from FIG. 1. Dual processor system 200 comprises a central storage, memory 230; a first processor, processor 210 including logical machine 211, L1 cache 212, L2 cache 213, and data transmission resource 214; and a second processor, processor 220 including logical machine 221, L1 cache 222, L2 cache 223, and data transmission resource 224. It will be appreciated that not all of the logically identical resources need to be duplicated for each of the processors. For example, it may be more efficient to physically share a resource among multiple processors while preserving the logical appearance of multiple single processors, each having a complete set of resources.

Figure 3:
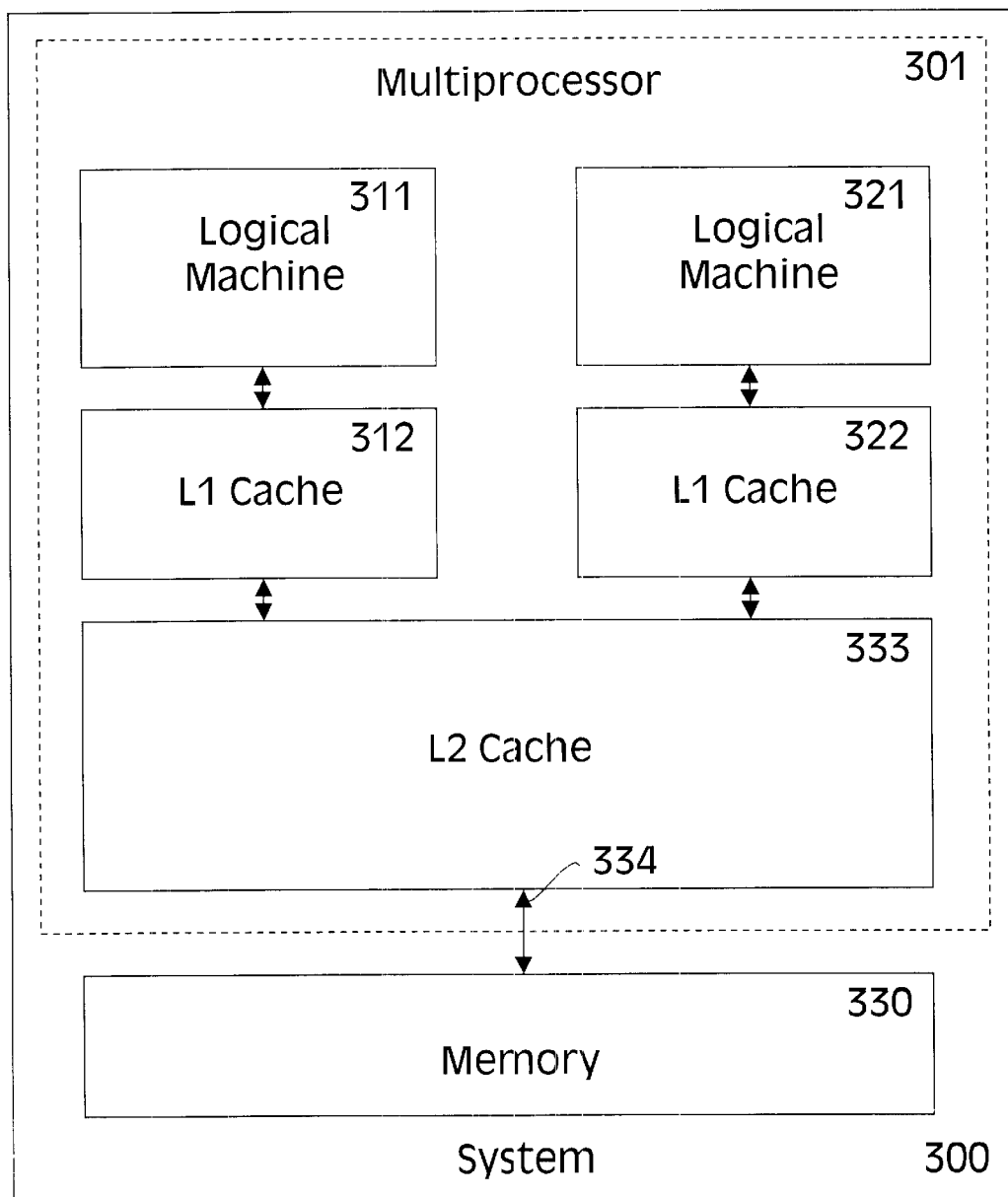
FIG. 3 illustrates a dual processor system including a multiprocessor with a shared resource.

FIG. 3 illustrates a dual processor system including one embodiment of a multiprocessor 301 with shared resources, as part of a system 300. System 300 also includes memory 330. Multiprocessor 301 also includes first logical machine 311 having exclusive access to L1 cache 312 and a second logical machine 321 having exclusive access to L1 cache 322. Both logical machine 311 and logical machine 321 have shared access to L2 cache 333, and data transmission resource 334. Shared L2 cache 333 may be used, for example, to store copies of data or instructions transmitted via data transmission resource 334 from memory 330 for either logical machine 311 or logical machine 321.

Since both logical machine 311 and logical machine 321 may access and exercise control over L2 cache 333 and data transmission resource 334, a new kind of control mechanism is needed. For example if logical machine 311 tries to switch the parity checking functionality of L2 cache 333 from an odd parity to an even parity, operations of logical machine 321 could be adversely affected.

Figure 4:
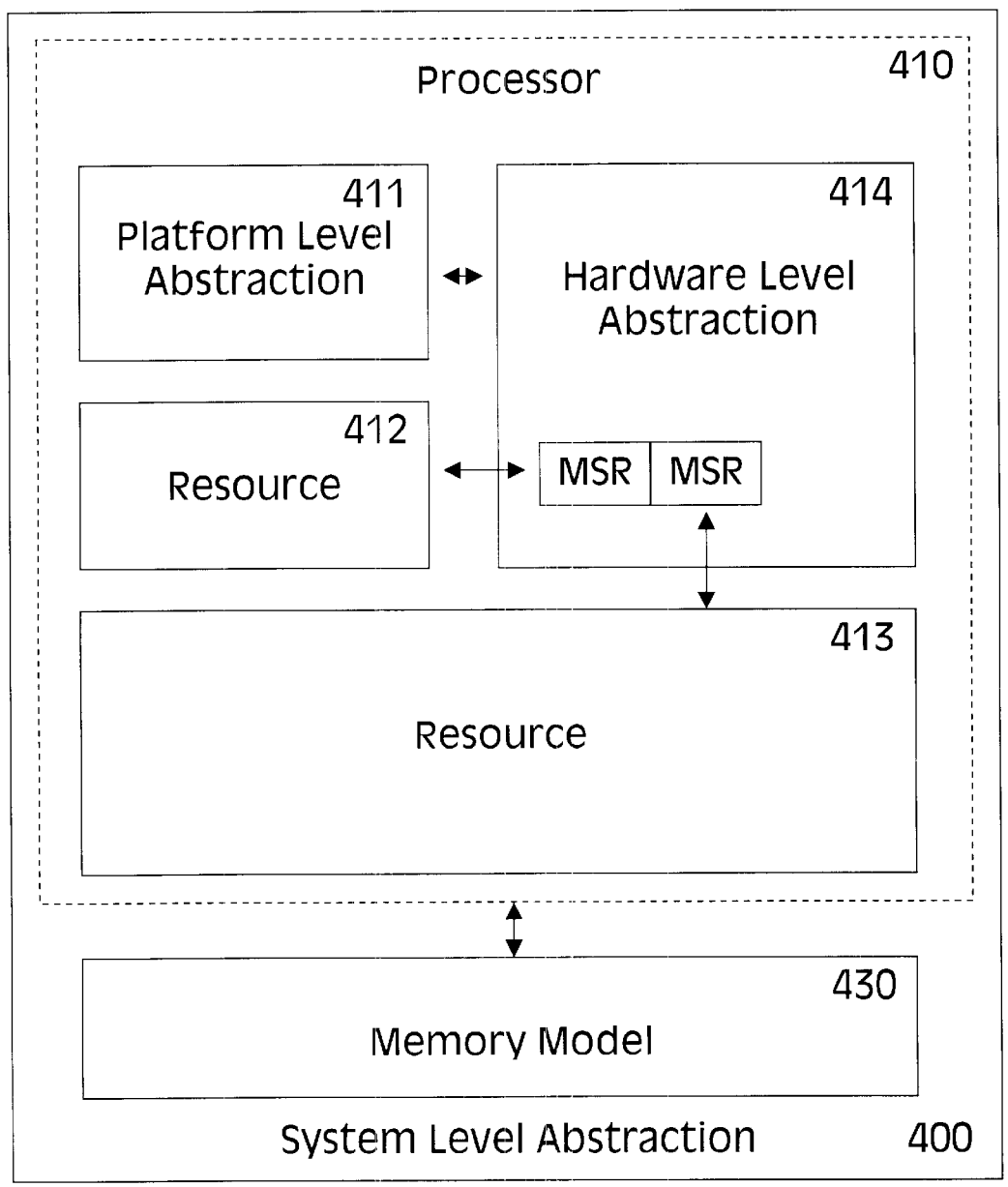
FIG. 4 illustrates one embodiment of a computing system using three abstraction levels.

FIG. 4 illustrates one embodiment of a control mechanism for a processor 410, including a platform level abstraction (PLA) 411 and a hardware level abstraction (HLA) 414. Processor 410 and memory model 430 are included in a system level abstraction (SLA) 400. It will be appreciated that the system level abstraction 400 may provide for more than one processor and even for more than one type of processor. It will also be appreciated that an abstraction of a processor may be viewed differently at each of the various abstraction levels.

Resource 412 and resource 413 represent exclusive or shared resources such as cache resources, busses or other data transmission resources, parity checking functionality resources, protocol resources, arithmetic unit resources, register resources or any other resources accessed through the hardware level abstraction 414. In one embodiment, access to resource 412 or to resource 413 is provided by a hardware level abstraction 414 through a corresponding mode specific register (MSR). For example, to affect a change of a bus protocol's address parity or timing, a write operation to a corresponding MSR may be performed from platform level abstraction 411. Thus hardware level abstraction 414 provides for uniform access to various exclusive and shared resources.

Figure 5:
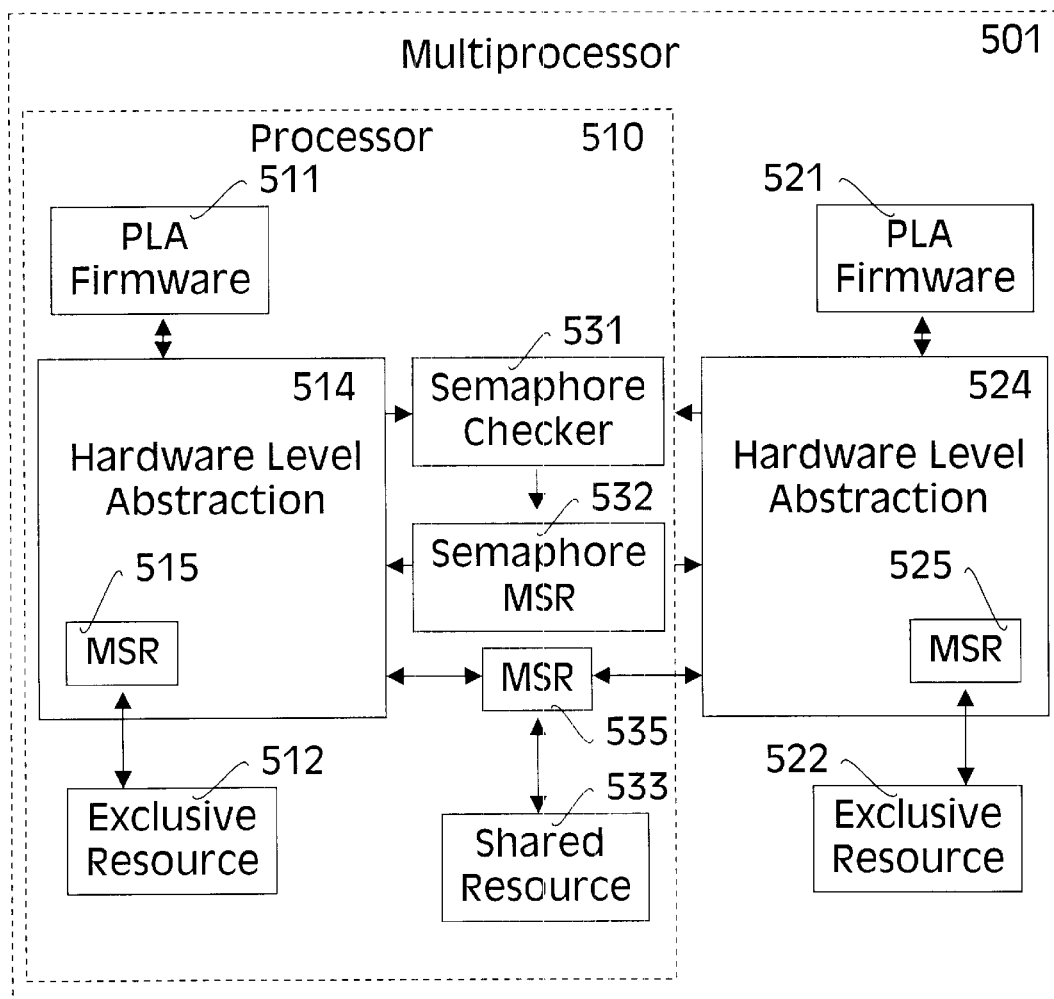
FIG. 5 illustrates one embodiment of a multiprocessor including a semaphore control mechanism.

FIG. 5 illustrates one embodiment of a multiprocessor 501 comprising a processor 510 that has access to exclusive resources 512 and shared resource 533. Access to exclusive resource 512 is accomplished through hardware level abstraction 514 by providing for PLA firmware to perform a write operation to the corresponding MSR 515. Similarly access to shared resource 533 is accomplished through hardware level abstraction 514 by providing for PLA firmware 511 to perform a write operation to the corresponding MSR 535. In one embodiment of a semaphore control mechanism, semaphore MSR 532 and semaphore checker 531 provide mutually exclusive access to shared resource 533 and corresponding MSR 535. Semaphore checker 531 arbitrates modification requests to semaphore MSR 532, identifying a single request from one or more semaphore modification requests received, the identified modification request including a processor identification number. Semaphore checker 531 allows the identified modification request if the ownership state of semaphore MSR 532 corresponds to the processor identification number (in which case the processor is releasing semaphore MSR 532) or if no processor presently has ownership of semaphore MSR 532. Arbitration for new ownership may be decided on a priority basis, or on a round-robin basis, or on any viable combination of suitable arbitration schemes. Through use of such a semaphore control mechanism, shared access to resources may be provided to PLA firmware 511 and to PLA firmware 521, requiring relatively few modifications to be added to a PLA firmware that does not support resource sharing.

Similarly, access to exclusive resource 522 is provided through hardware level abstraction 524 by PLA firmware 521 performing a write operation to corresponding MSR 525. Access to shared resource 533 is provided through hardware level abstraction 524 by PLA firmware 521 performing a write operation to corresponding MSR 535 with semaphore MSR 532 and semaphore checker 531 providing mutually exclusive access to MSR 535 and thus to shared resource 533.

Figure 6A:
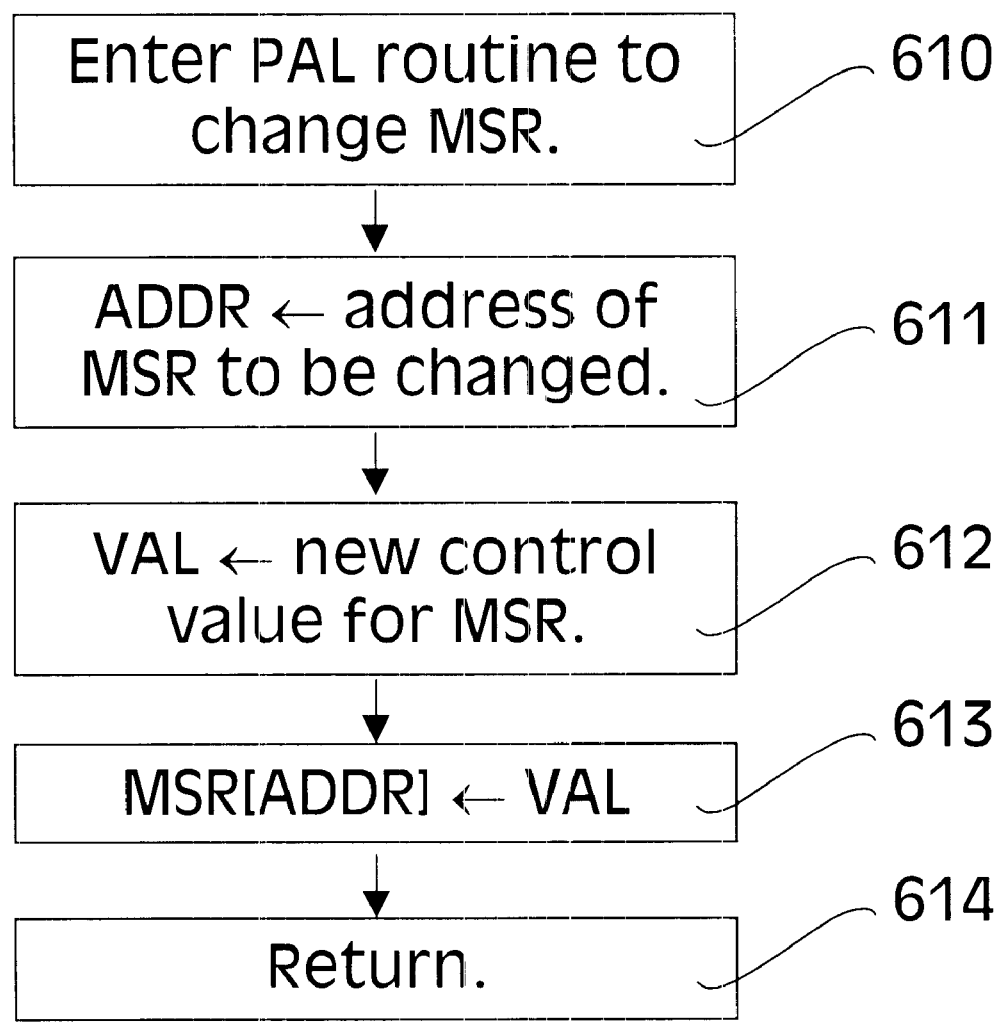
FIG. 6a illustrates one embodiment of a platform level abstraction process for accessing a resource through a hardware level abstraction layer.

FIG. 6a illustrates a diagram of one embodiment of a process for accessing resources using an MSR of a hardware level abstraction. The process is performed by processing blocks that may comprise software or firmware operation codes executable by general purpose machines or by special purpose machines or by a combination of both. The starting point of the PAL process to modify an MSR is at processing block 610 and processing proceeds to processing block 611. In processing block 611, ADDR is assigned the address value of the MSR to be changed. Next, in processing block 612, VA is assigned a new control value to be written into the MSR. Then, in processing block 613, the new control value in VAL is written to the MSR at address ADDR. Having completed the MSR modification, processing returns from the MSR modification process (processing block 614).

Through use of a semaphore control mechanism as disclosed above, shared access to resources may be provided with relatively few modifications to the PLA firmware that does not support resource sharing.

Figure 6B:
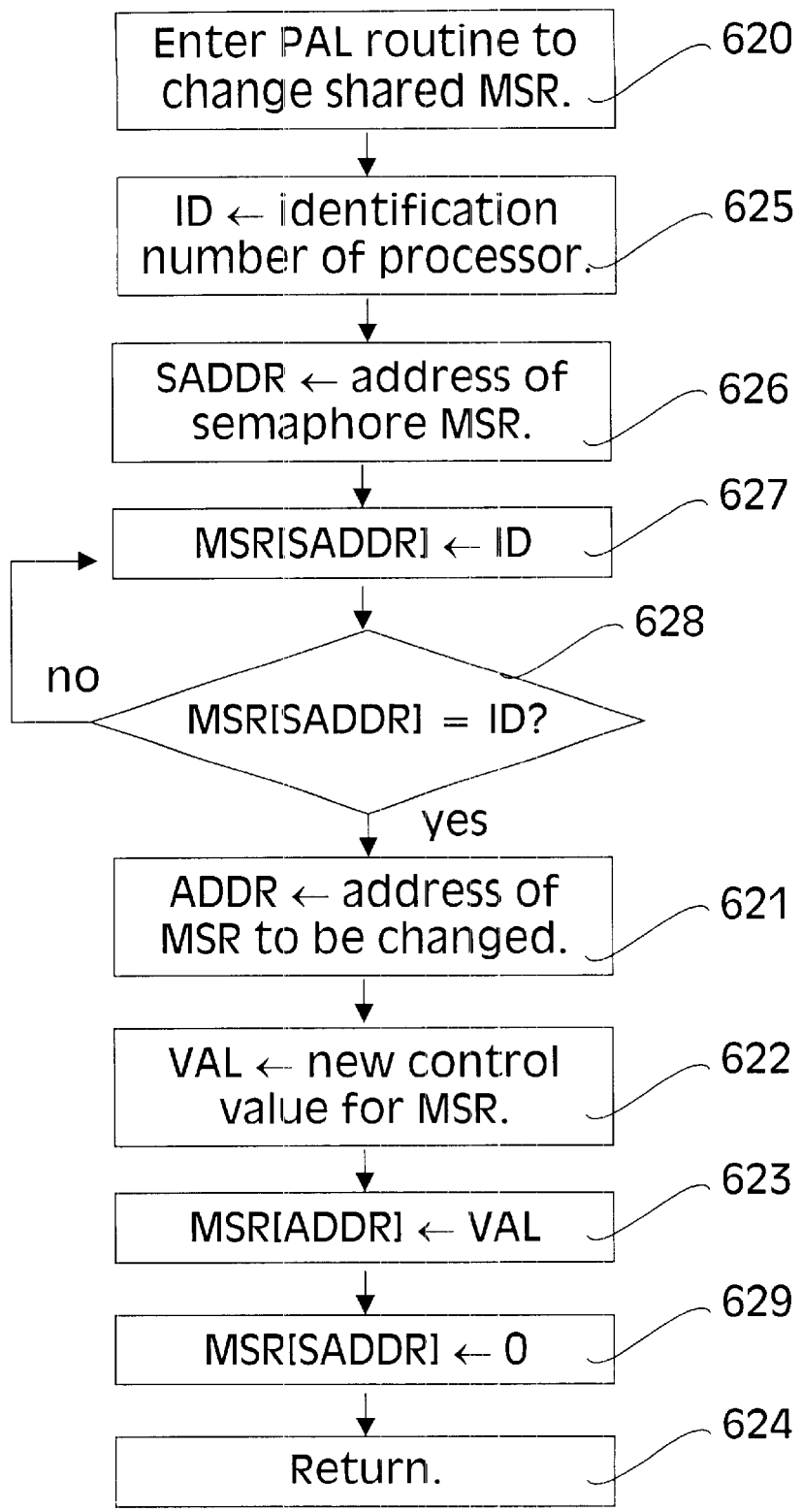
FIG. 6b illustrates one embodiment of a platform level abstraction process for accessing a shared resource through a hardware level abstraction layer using a semaphore control mechanism.

FIG. 6b illustrates a diagram of one embodiment of a process for accessing shared resources using a semaphore control mechanism. The starting point to the PA process to modify a shared MSR is at processing block 620 and processing proceeds to processing block 625. In processing block 625, ID is assigned the processor identification number to be written into the semaphore MSR. Next, in processing block 626, SADDR is assigned the address value of the semaphore MSR to be requested. Then, in processing block 627, a modification request is made to have the processor identification number in ID written to the semaphore MSR at address SADDR. Afterwards, in processing block 628, the semaphore MSR at address SADDR is tested to see if it contains the same processor identification number in ID. If not, processing proceeds to repeat the modification request at processing block 627. Otherwise the requesting processor has received ownership of the semaphore and processing proceeds to processing block 621. In processing block 621, ADDR is assigned the address value of the shared MSR to be changed. Then, in processing block 622, VAL is assigned a new control value to be written into the shared MSR. Next, in processing block 623, the new control value in VAL is written to the shared MSR at address ADDR. Having completed the shared MSR modification, ownership of the semaphore MSR is released in processing block 629 by writing a zero into the semaphore MSR at address SADDR and processing returns from the shared MSR modification process (processing block 624).

Thus the semaphore control mechanism provides for a high degree of programmable firmware reuse requiring relatively few modifications from a processor that does not share resources.

The foregoing disclosures are illustrated by way of example and not limitation with unnecessary detail omitted so as not to obscure the invention. It will also be appreciated that the apparatuses and methods described above can be modified in arrangement and detail by those skilled in the art. For example, complex processors may access very large numbers of exclusive and shared resources, making it more efficient to provide grouped access to some resources and mutually exclusive access to groups of shared resources rather than individual resources. It may also be desirable to hide, from the platform level abstraction layer, details with respect to which resources are shared and which resources are exclusive, and to implement these details in the hardware level abstraction layer instead. These and other various modifications and changes may be made without departing from the broader spirit and scope of the invention.

A multiprocessor that provides shared access to resources may introduce new complexities with respect to error detection, correction and recovery. When a machine check abort (MCA) exception occurs in a processor, an error condition has arisen that requires corrective action. If execution were permitted to continue unchecked under such a condition, damage or data corruption would potentially result. For example, one condition that could trigger an MCA is known as a parity error. A particular bit in a cache memory could be stuck at some value, causing data involving that bit to have the wrong parity. An error condition monitor (for example, a parity checker) would identify the error condition. If the cache data were written out to main memory, the corruption would be spread to main memory. Therefore such a condition requires corrective action to prevent further damage. In a single processor, either data recovery or system shutdown could proceed in a straight forward manner in response to the triggered MCA. The three stages of MCA handling are: first, to quiet the processor; second, to check for error conditions; and third, to recover if possible, or else to shutdown.

In a multiprocessor though, MCA handling may require synchronization of processors and arbitration for shared resources. For example, corrupted data in a shared cache memory could be used by more than one processor. If the processor that triggered the MCA attempts recovery, the behavior of other processors may be affected.

Unlike many other exception handlers, in one embodiment, an MCA handler may not begin checking error conditions until the processor activity is quieted so that all outstanding transactions are cleared. Typically, operations in execution queues will be permitted to complete prior to fetching the rest of the MCA handler. In one embodiment of an MCA handler, this may be accomplished by executing a HALT operation, which may force all prior operations to retire, including operations in cache or bus queues or other previously scheduled transactions. The operation that triggered the MCA, having not yet been scheduled, remains outstanding. With all prior operations having been completed, the internal machine state represents a clean boundary between operations. It will be appreciated by those skilled in the art that for certain types of processors, some operations may have completed out of sequential instruction order but that corresponding results would not yet have been architecturally committed.

For handling an MCA, it is desirable that the internal machine be in an idle state as a result of executing the HALT operation. Both the processor pipeline and the bus activity would then be idle for a particular processor handling the MCA. In a multiprocessor though, another processor may be employing shared resources, thereby inhibiting achievement of the desired machine state. It is therefore desirable to prevent other processors from disturbing the idle state of the processor handling the MCA.

On the other hand, some processors may suffer performance degradation due to an MCA in another processor. Therefore, it is also desirable to minimize, to the extent possible, the performance impact on processors that have not originated an MCA.

TABLE 1

Dual processor MCA handling

| Error Type | Error Origin | Processor A | Processor B | Comments |
| --- | --- | --- | --- | --- |
| Single Error | Processor A, Exclusive resource | MCA entry | HALT & wait | If no shutdown, B continues. |
| Single Error | Shared resource | MCA entry | MCA entry | MCA entry by semaphore. Flags to avoid double checks. |
| Double Error | Both processors | MCA entry | MCA entry | MCA entry by semaphore. Synch on recovery. |
| Double Error | Processor A, Shared resource | MCA entry | MCA entry, HALT & wait | A enters MCA. B continues upon A's recovery. |
| Triple Error | Both processors, Shared resource | MCA entry | MCA entry | MCA entry by semaphore. Synch on recovery. |

Table 1 outlines various possible scenarios for handling MCAs in a dual processor. There are two possibilities for the occurrence of a single error: in the first, the error occurs in an exclusive resource of a single processor; and in the second, the error occurs in a shared resource. For one embodiment of an MCA handling mechanism, the MCA is broadcast to both processors so that they may both participate in quieting activity through execution of a HALT operation. If both processors must handle an MCA triggered by the same resource (as is the case for the second type of single error) it is possible to increase and potentially optimize performance by setting flags to prevent unnecessary independent double-checking of a condition by both processors. Use of a semaphore ensures that MCA entry occurs for only one processor at a time.

There are also two possibilities for the occurrence of a double error: in the first, the errors occurs in both processors; and in the second, the errors occur in a single processor and in a shared resource. In the case where both processors independently handle MCAs, they synchronize after recovery and prior to resuming normal execution. Synchronization is also advisable for triple errors (where the errors occur in both processors and in a shared resource), since both processors will attempt to recover and resume execution.

Figure 7:
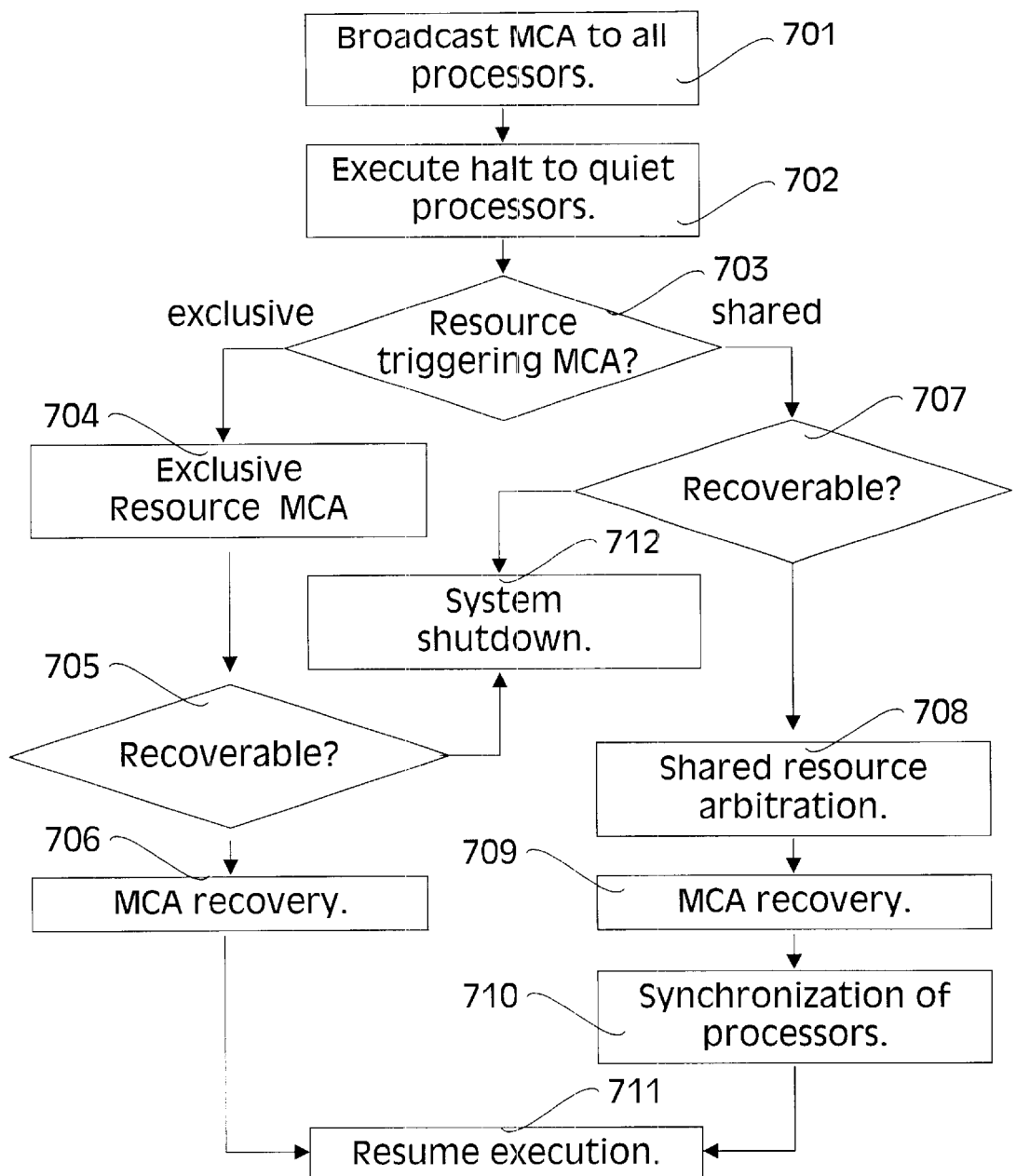
FIG. 7 illustrates one embodiment of a process for performing a machine check abort (MCA) in a multiprocessor.

FIG. 7 illustrates a diagram of one embodiment of a process for handling MCA's in a multiprocessing system with shared resources. In processing block 701, an MCA is broadcast to all processors. In response, processing proceeds in processing block 702 where each processor executes a HALT operation, which quiets activity in the processing cores.

In processing block 703, the triggering resource is identified as shared or as exclusive. If the resource is identified as exclusive in processing block 703, then processing continues in processing block 704 with the execution of an exclusive resource MCA handler. If the resource is identified as recoverable in processing block 705, then processing continues in processing block 706. Otherwise a system shutdown is initiated in processing block 712. In processing block 706, MCA recovery is effected and normal execution resumes in processing block 711.

If the resource is identified as shared in processing block 703, then processing continues to processing block 707 where the resource is checked to identify it as recoverable so that processing may continue in processing block 708, or a system shutdown is initiated in processing block 712. If the resource is identified as recoverable in processing block 707, then in processing block 708, arbitration for the shared resource is performed. When access to the shared resource is obtained, MCA recovery is effected in processing block 709 and processing continues to processing block 710. In processing block 710, synchronization of processors is achieved and normal execution is resumed in processing block 711.

It will be appreciated that additional performance optimizations may also be achieved if the origin of an MCA can be isolated to a particular shared resource and if it can be guaranteed that limited activity in other processors will not be affected by the MCA triggering error. In such a case, it would be possible to prohibit access to shared resources, through use of semaphores for example, while permitting some limited activity in other processors to continue.

Figure 8:
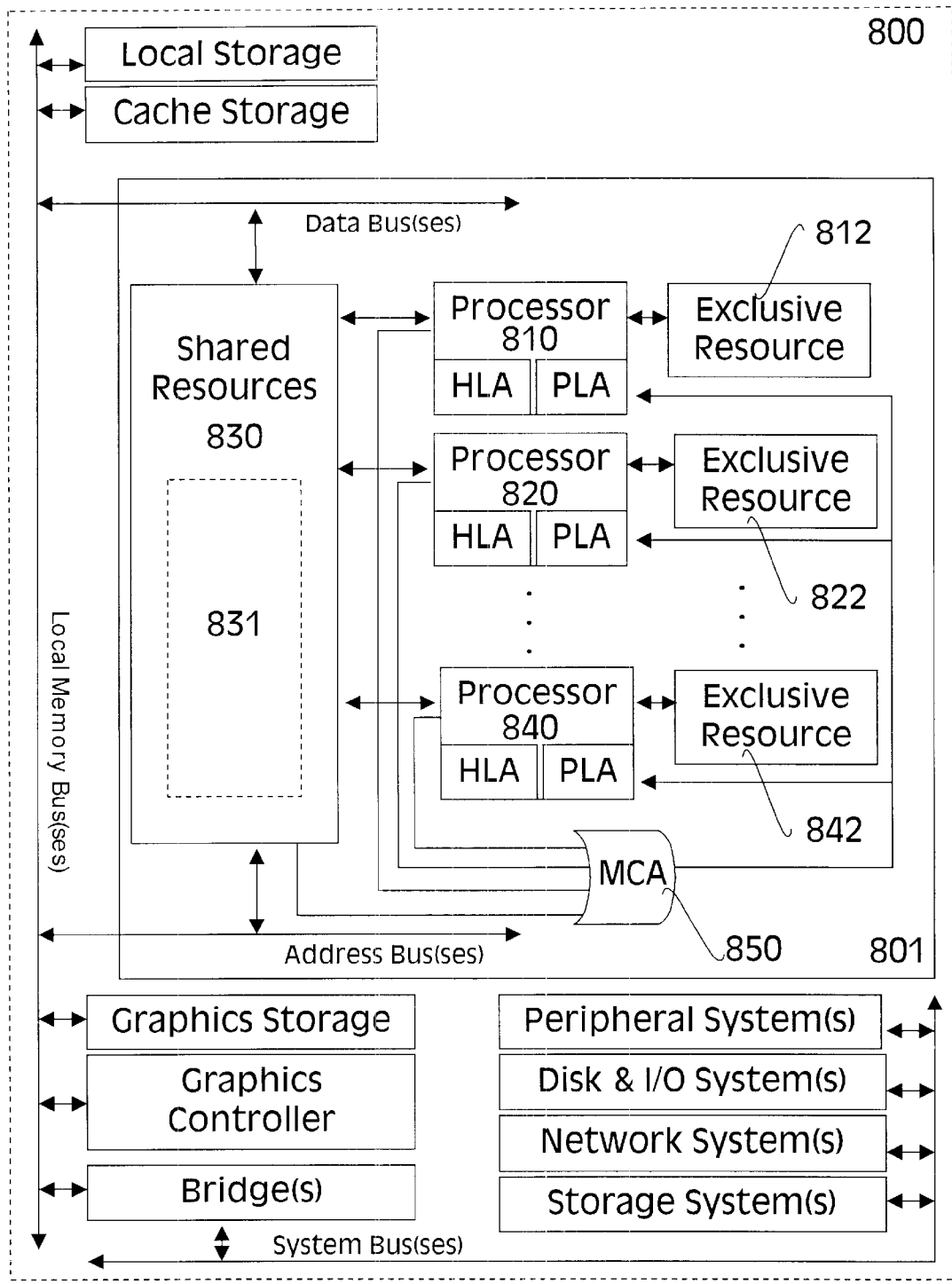
FIG. 8 illustrates one embodiment of a computing system including a multiprocessor with a shared resource control mechanism, which supports an MCA handling mechanism.

It will also be appreciated that the methods and apparatuses herein disclosed may be used in multiple user multiprocessing systems or in single user multiprocessing systems or in multiple core multiprocessors. FIG. 8 illustrates an embodiment of multiple core multiprocessor 801 including: a semaphore control mechanism (SCM) 831, shared resources 830, processor 810 (including a PLA and an HLA to access exclusive resource 812 and shared resources 830), processor 820 (including a PLA and an HLA to access exclusive resource 822 and shared resources 830), . . . and processor 840 (including a PLA and an HLA to access exclusive resource 842 and shared resources 830). Multiple core multiprocessor 801 further includes a MCA handling mechanism, which works with SCM 831 to provide improved system availability and reliability. MCA broadcasts are provided by broadcast network 850. The MCA handling mechanism provides for synchronization of multiple processors, 810, 820, . . . 840, and shared resources 830 and for timely execution resumption within the processors that remain on-line.

It will be appreciated that multiple core multiprocessor 801 may comprise a single die or may comprise multiple dies and that processor 810 may be similar or dissimilar to processor 820. It will also be appreciated multiple core processor 801 may further comprise bus control circuitry or other communication circuitry, processors in addition to processors 810, 820 and 840 and exclusive resources in addition to exclusive resources 812, 822 and 842. It will also be appreciated that shared resource control mechanism 831 may include a semaphore control mechanism, or that it may include scheduling queues, or that it may include other types of control mechanisms for arbitrating access to shared resources.

FIG. 8 further illustrates an embodiment of computing system 800 including: semaphore control mechanism 831; shared resources 830; processor 810, processor 820, . . . and processor 840. Computing system 800 may comprise a personal computer including but not limited to central processing 801, graphics storage, other cache storage and local storage; system bus(ses), local bus(ses) and bridge(s); peripheral systems, disk and input/output systems, network systems and storage systems.

The above description is intended to illustrate preferred embodiments of the present invention. From the discussion above it should also be apparent that the invention can be modified in arrangement and detail by those skilled in the art without departing from the principles of the present invention within the scope of the accompanying claims.

What is claimed is:

1. An article of manufacture including one or more machine-accessible medium having operation codes stored thereon which, when accessed by one or more machines, causes the one or more machines to:
   identify a machine check abort exception condition;
   quiet a plurality of processors in response to the identification of the machine check abort exception condition;
   permit a first processor of the plurality of processors to continue to execute a first exception handler responsive to the identified machine check abort exception condition and to attempt a recovery; and
   permit a second processor of the plurality of processors to continue execution responsive to the attempted recovery of the first processor being a success.

2. The article of manufacture recited in claim 1 wherein the processors are quieted by permitting scheduled operations to complete.

3. The article of manufacture recited in claim 2 wherein the scheduled operations are permitted to complete as a result of each the plurality of processors executing a HALT instruction.

4. The article of manufacture recited in claim 1 which, when accessed by one or more machines, further causes the one or more machines to:
   permit the second processor to continue to execute a second exception handler responsive to the identified machine check abort exception condition.

5. The article of manufacture recited in claim 4 wherein the continued execution of the first exception handler by the first processor is mutually exclusive to the continued execution of the second exception handler by the second processor.

6. The article of manufacture recited in claim 5 which, when accessed by one or more machines, further causes the one or more machines to:
   synchronize the first processor and the second processor responsive to the attempted recovery of the first processor being a success.

7. The article of manufacture recited in claim 5 wherein the mutually exclusive continued execution is accomplished through use of a semaphore.

8. The article of manufacture recited in claim 5 wherein the identified machine check abort exception condition involves a resource shared by the first processor and the second processor.

9. The article of manufacture recited in claim 8, which when accessed by one or more machines, further causes the one or more machines to:
   arbitrate between the first processor and the second processor for access to the shared resource.

10. A method comprising:
    identifying a machine check abort exception condition;
    quieting a plurality of processors in response to the identification of the machine check abort exception condition;
    permitting a first processor of the plurality of processors to continue to execute a first exception handler responsive to the identified machine check abort exception condition and to attempt a recovery; and
    permitting a second processor of the plurality of processors to continue execution responsive to the attempted recovery of the first processor being a success.

11. The machine-executable encoded method recited in claim 10 wherein the processors are quieted as a result of each the plurality of processors executing a HALT instruction.

12. The method recited in claim 10 further comprising:

permitting the second processor to continue to execute a second exception handler responsive to the identified machine check abort exception condition.

13. The method recited in claim 12 further comprising:

synchronizing the first processor and the second processor responsive to a success with respect to the attempted recovery of the first processor.

14. The method recited in claim 12 wherein the continued execution of the first exception handler by the first processor is mutually exclusive to the continued execution of the second exception handler by the second processor.

15. The method recited in claim 14 wherein the mutually exclusive continued execution is accomplished through use of a semaphore.

16. The method recited in claim 14 wherein the identified machine check abort exception condition involves a resource shared by the first processor and the second processor.

17. The method recited in claim 16 further comprising:

arbitrating between the first processor and the second processor for access to the shared resource.

18. A multiprocessor system comprising:

a plurality of processors;

means for identifying a machine check abort exception condition;

means for quieting the plurality of processors;

means for handling the identified machine check abort exception condition and attempting a recovery; and means for permitting the plurality of processors to continue execution upon the attempted recovery being a success.

19. The multiprocessor system recited in claim 18 further comprising:

means for mutually exclusive handling of the identified machine check abort exception condition by the plurality of processors.

20. The multiprocessor system recited in claim 19 further comprising:

means for arbitrating among the plurality of processors for access to the shared resource.

21. The multiprocessor system recited in claim 18 wherein the plurality of processors are fabricated on a single die.

22. A multiprocessor comprising:

a plurality of processors including a first processor;

an error condition monitor to identify a machine check abort exception condition;

a communication device to signal to the plurality of processors to quiet activity;

an executable exception handler including one or more processor-accessible medium having executable code stored thereon, which, when accessed by the first processor, causes the first processor to check error conditions responsive to the identified machine check abort exception condition, and to attempt a recovery;

a synchronization mechanism to permit the plurality of processors to continue execution if the attempted recovery is a success.

23. The multiprocessor recited in claim 22 wherein the communication device comprises a broadcast network to broadcast the machine check abort exception condition.

24. The multiprocessor system recited in claim 22 wherein the plurality of processors may have mutually exclusive access to the executable exception handler to provide mutually exclusive handling of the identified machine check abort exception condition.

25. The multiprocessor system recited in claim 22 wherein the plurality of processors are fabricated on a single die.

26. The multiprocessor system recited in claim 22 wherein the synchronization mechanism is further to arbitrate among the plurality of processors for access to a shared resource.

27. The multiprocessor recited in claim 26 wherein the synchronization mechanism comprises a semaphore control mechanism.

28. An apparatus comprising:

an error condition monitor to identify a machine check abort exception condition;

a communication device to signal to a first plurality of machines to quiet activity;

a synchronization mechanism to permit the first plurality of machines to continue activity upon a successful recovery from the identified machine check abort exception condition.

29. The apparatus of claim 28 further comprising a machine-executable encoded method including one or more machine-accessible medium having executable code stored thereon which, when executed by one or more machines, causes the one or more machines to:

permit a first machine of the first plurality of machines to check error conditions responsive to the identified machine check abort exception condition, and to attempt a recovery.

30. The apparatus of claim 28 wherein the identified machine check abort exception condition involves a resource shared by the first machine and a second machine of the first plurality of machines.

* * * * *

UNITED STATES PATENT AND TRADEMARK OFFICE
CERTIFICATE OF CORRECTION

PATENT NO.   : 6,684,346 B2
DATED        : January 27, 2004
INVENTOR(S)  : Tu et al.

It is certified that error appears in the above-identified patent and that said Letters Patent is hereby corrected as shown below:

Column 4,
Line 22, delete "PA", insert -- PAL --.

Signed and Sealed this

Thirteenth Day of April, 2004

JON W. DUDAS
*Acting Director of the United States Patent and Trademark Office*